US009477746B2

(12) United States Patent
Herron et al.

(10) Patent No.: US 9,477,746 B2
(45) Date of Patent: Oct. 25, 2016

(54) SYSTEM AND METHOD FOR TELEVISION SEARCH ASSISTANT (75) Inventors: Jon Michael Herron, Atlanta, GA (US); Vicki Reyzelman, Atlanta, GA (US); Shiva Jaini, San Francisco, CA (US)

(73) Assignee: Excalibur IP, LLC, Sunnyvale, CA (US)

( * ) Notice: Subject to any disclaimer, the term of this patent is extended or adjusted under 35 U.S.C. 154(b) by 9 days.

(21) Appl. No.: 13/554,872

(22) Filed: Jul. 20, 2012

(65) Prior Publication Data

US 2012/0290586 A1 Nov. 15, 2012

Related U.S. Application Data (63) Continuation of application No. 12/845,566, filed on Jul. 28, 2010, now Pat. No. 8,250,077.

(51) Int. Cl.
*G06F 7/00* (2006.01)
*G06F 17/30* (2006.01)

(52) U.S. Cl.
CPC ....... *G06F 17/3064* (2013.01); *G06F 17/3082* (2013.01)

(58) Field of Classification Search
CPC ...... G06F 17/30; G06F 7/00; G06F 17/3082; G06F 17/3064; G06F 17/30017; G06F 17/3086; G06F 17/3002; G06F 17/30011; G06F 17/30389; G06F 17/30958; G06F 17/30026
USPC ................ 707/706, 713, 722, 723, 731–737, 707/748–754, 759–772
See application file for complete search history.

(56) References Cited

U.S. PATENT DOCUMENTS 6,078,916 A * 6/2000 Culliss
6,564,213 B1 5/2003 Ortega et al.
6,772,150 B1 8/2004 Whitman et al.
(Continued)

FOREIGN PATENT DOCUMENTS

JP 2004312627 11/2004
JP 2004362451 12/2004
(Continued)

OTHER PUBLICATIONS www.yahoo.com "Yahoo Television Guide Search Query". Jun. 2009; 2 pages.

*Primary Examiner* — Azam Cheema
(74) *Attorney, Agent, or Firm* — James J. DeCarlo; Greenberg Traurig, LLP (57) ABSTRACT A television guide search query is received from a user. A plurality of suggested search terms are selected. Each of the plurality of suggested search terms is assigned to, and is ranked within, one of a plurality of categories A number of suggested search terms to be returned to the user, $n_c$, is determined for each of the plurality of categories, $n_c$ being equal to a ratio of the number of suggested search terms in the respective category to a total number of suggested search terms multiplied by a total number of displayed search terms. A result set is created by adding, for each of the plurality of categories, the top ranked $n_c$ suggested search terms to the result set. The result set is transmitted to the user. A selection of a search term is received from the user and is used to conduct a television guide search.

20 Claims, 7 Drawing Sheets

(56) References Cited

U.S. PATENT DOCUMENTS

| | | |
|---|---|---|
| 2001/0042064 A1 | 11/2001 | Davis et al. |
| 2003/0163456 A1 | 8/2003 | Hua et al. |
| 2004/0030741 A1 | 2/2004 | Wolton et al. |
| 2005/0120366 A1* | 6/2005 | Thurbon .................... 725/9 |
| 2006/0248078 A1* | 11/2006 | Gross et al. ................ 707/5 |
| 2007/0061321 A1 | 3/2007 | Venkataram |
| 2008/0256575 A1* | 10/2008 | Raju et al. ................ 725/39 |
| 2010/0121714 A1 | 5/2010 | Bovenschulte |
| 2010/0153885 A1 | 6/2010 | Yates |
| 2010/0157157 A1* | 6/2010 | Yi ...................... H04N 5/44591 348/570 |
| 2010/0161492 A1* | 6/2010 | Harvey et al. ................ 705/50 |
| 2011/0314006 A1 | 12/2011 | Sweeney et al. |
| 2012/0066200 A1 | 3/2012 | Lunenfeld |

FOREIGN PATENT DOCUMENTS

| | | |
|---|---|---|
| JP | 2005322165 | 11/2005 |
| WO | WO2004091200 | 10/2004 |

* cited by examiner

SYSTEM AND METHOD FOR TELEVISION SEARCH ASSISTANT

This application is a continuation of and claims the benefit of U.S. patent application Ser. No. 12/845,566, filed Jul. 28, 2010, now U.S. Pat. No. 8,250,077 which is hereby incorporated by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for interfaces for online television guides, and more particularly, to systems and methods for providing search assistance in online television guides.

BACKGROUND OF THE INVENTION

There are various web-based services, that feature various types of online, searchable television programming, and/or channel guides. Given the large number of programs that may be listed, however, users may find it difficult to compose a query that returns an accurate and focused results. Furthermore, such services often only provide the ability to search titles, but do not provide the ability to search for channels or cast members.

SUMMARY OF THE INVENTION

In one embodiment, the invention is a method. A network search query comprising at least one token is received over a network. A plurality of suggested search terms are selected, using a computing device, from a suggested search term database that match the network search query. Each of the plurality of suggested search terms is assigned to one of a plurality of categories. The plurality of suggested search terms are ranked using the computing device within each of the plurality of categories. A number of suggested search terms to be returned to the user, $n_c$, for each of the plurality of categories is determined, using the computing device, $n_c$ being equal to a ratio of the number of suggested search terms in the respective category to a total number of suggested search terms multiplied by a total number of displayed search terms. A consolidated result set is created, using the computing device, by adding, for each of the plurality of categories, the top ranked $n_c$ suggested search terms in the respective category to the consolidated result set. The consolidated result set is transmitted, over the network, to the user. A selection of a suggested search term is received, over the network, from the user and a network search is conducted using the computing device using the selected suggested search term.

In one embodiment, the invention is a system comprising a plurality of modules, each of the modules comprising one or more processors programmed to execute software code retrieved from a computer readable storage medium storing software for various functions. In one embodiment, the modules comprise: a search query receiving module for receiving, over a network, from users, network search queries, each network search query comprising at least one token; a suggested search term selection module for selecting from a suggested search term database, for each network search query received by the search query receiving module, a set of suggested search terms that match the respective network search query, each of the set of suggested search terms being assigned to one of a plurality of categories; a suggested search term ranking module for ranking suggested search terms within each of the plurality of categories within each set of suggested search terms selected by the suggested search term selection module; a category result determination module for determining, for each set of suggested search terms ranked by the suggested search term ranking module, a number of suggested search terms to be returned in a consolidated result set, $n_c$, for each of the plurality of categories, each $n_c$ being equal to a ratio of the number of suggested search terms in the respective category to the total number of suggested search terms multiplied by a predetermined total number; a consolidated result set creation module for creating the consolidated result set for each set of suggested search terms processed by the category result determination module by adding, for each of the plurality of categories, a top ranked $n_c$ suggested search terms in the respective category to the consolidated result set; a result set transmission module for transmitting, over the network, consolidated result sets created by the consolidated result set creation module, to users whose query resulted in the creation of the respective consolidated result set; a search term selection receiving module for receiving, over the network, from users who received consolidated result sets from the result set transmission module, selections of suggested search terms from the respective consolidated result set; a network search module for conducting network searches using selected suggested search terms selected by the search term selection receiving module.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure, a search term should be understood to represent a string of one or more tokens that can convey a concept or set of concepts and can be used to search a database for entries relating to such concepts. A search term could comprise a single character or symbol, a single word or word stem, or group of words or a natural language phrase.

The present invention is directed to systems and methods for improving the usability of online programming guides by providing a search assist function that presents suggested search terms organized in a number of programming categories. In one embodiment, suggested search terms are presented categorized by channel, program title and cast member name.

Figure 1:
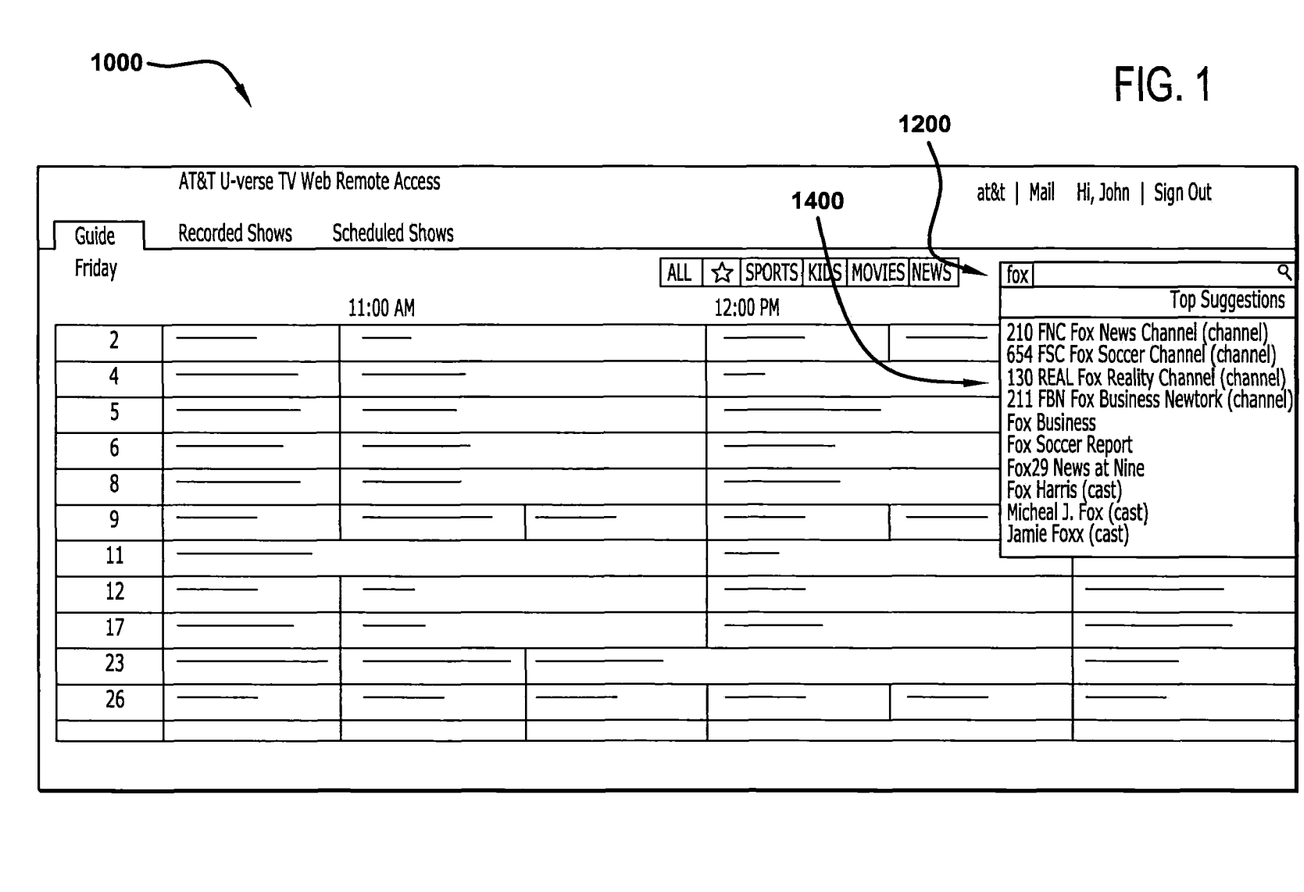
FIG. 1 presents a television guide user interface after a user has entered the search string "fox" in a query entry box.
Figure 2:
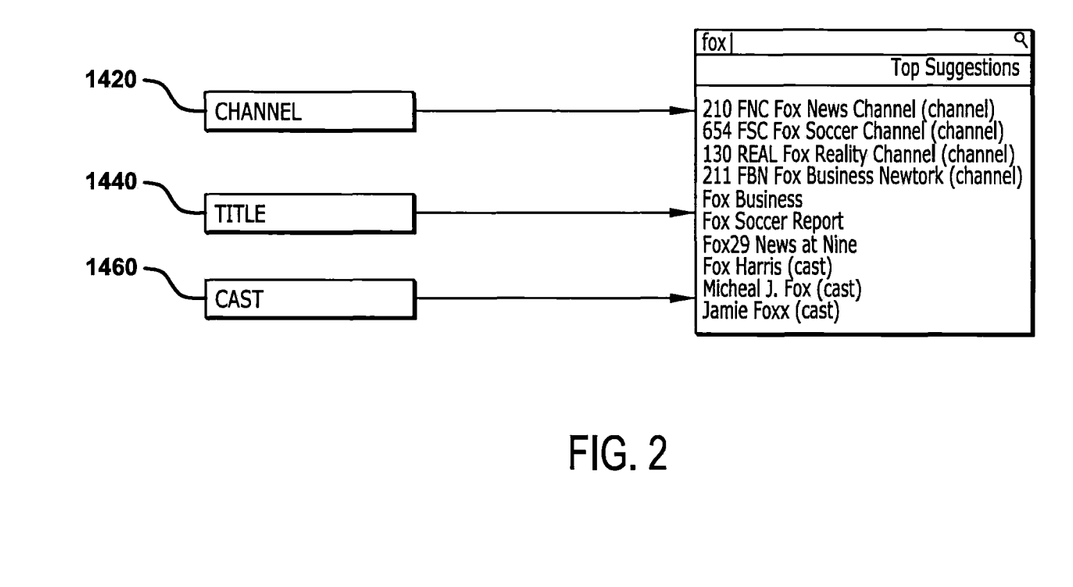
FIG. 2 displays a closer view of the suggested search term dropdown list of television guide user interface of FIG. 1.
Figure 3:
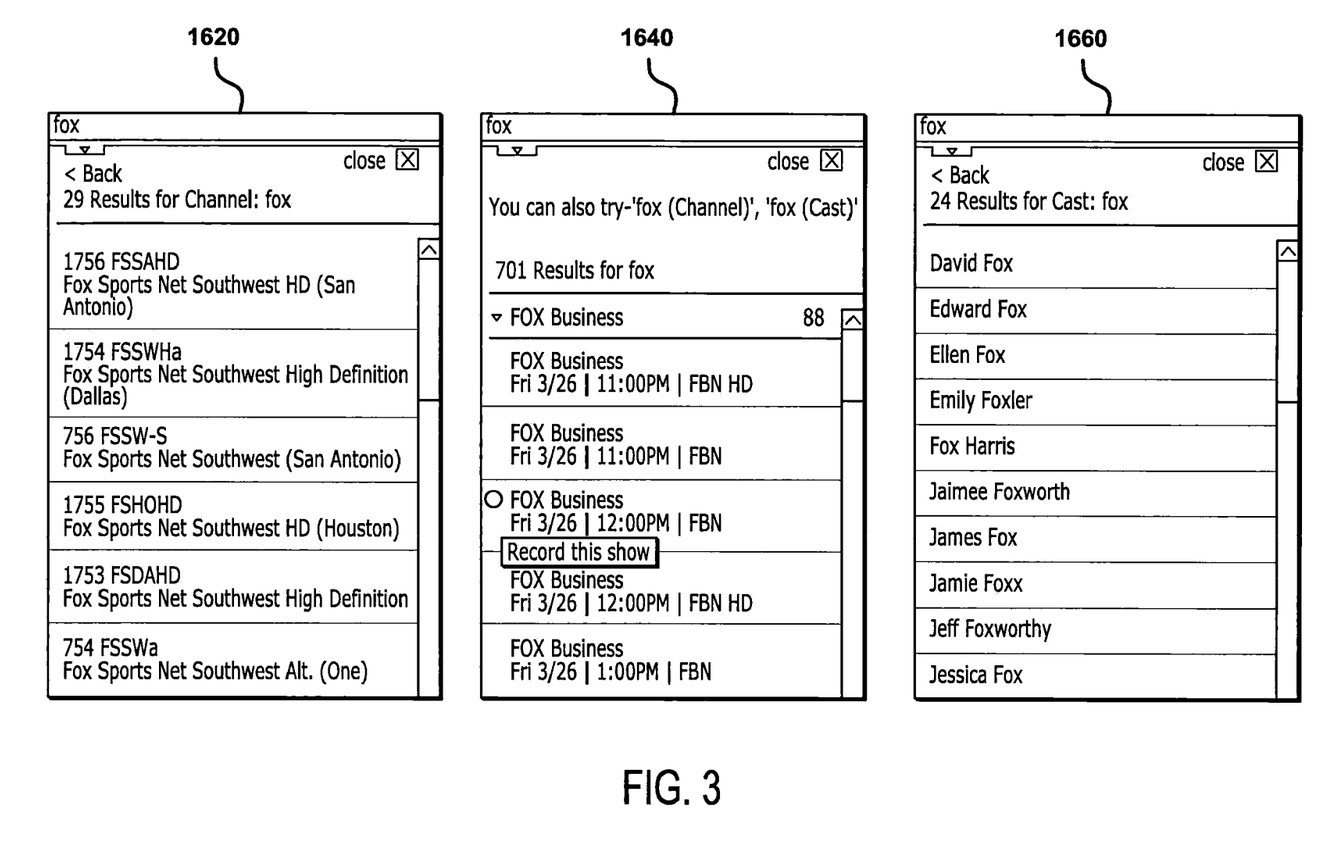
FIG. 3 displays sample search results produced when the user selects a search term relating to channels, program titles and cast members.
Figure 5:
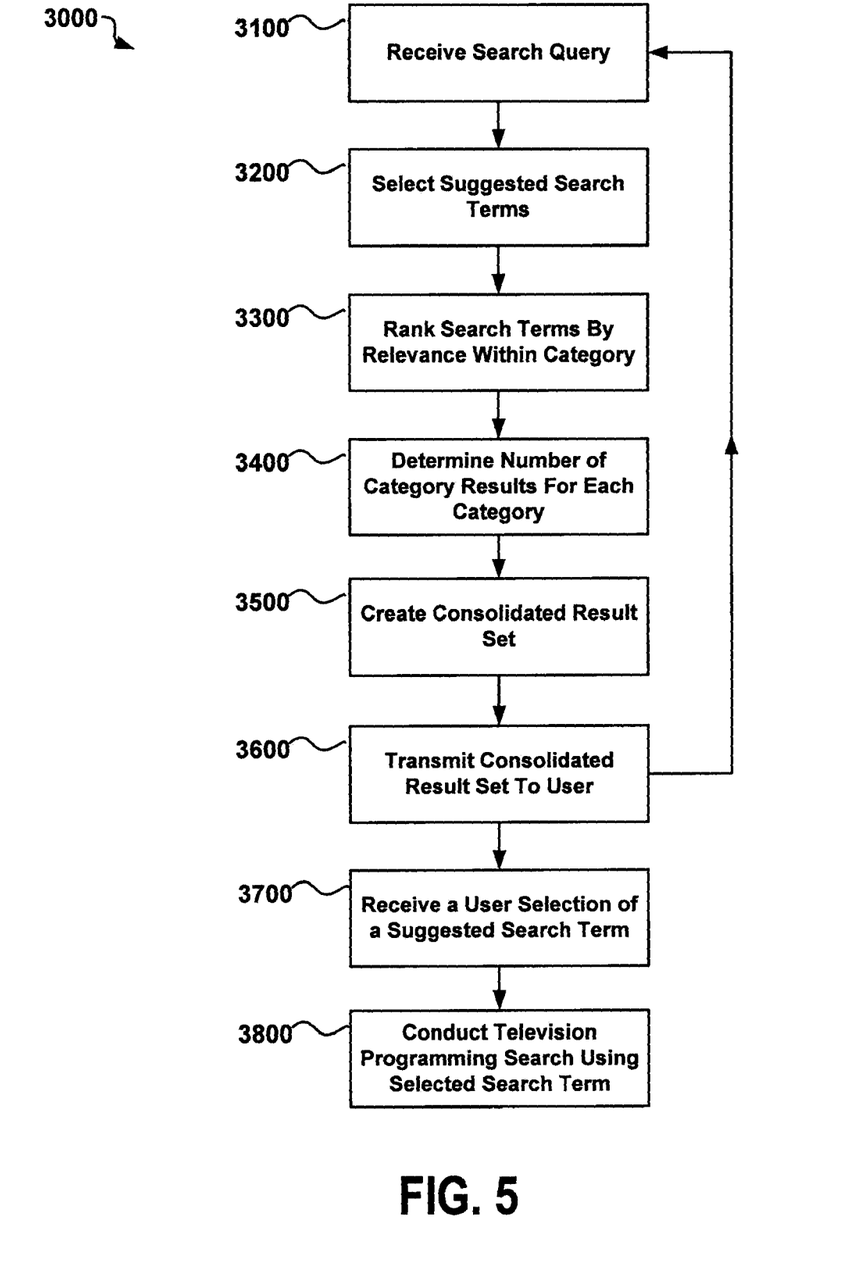
FIG. 5 illustrates one embodiment of a method for providing a category-based search assist function in an online television guide.

FIG. 1-3 illustrates one embodiment of a television guide user interface 1000 providing search assist functions and query capabilities by channel, title and cast. FIG. 5 presents a television guide user interface 1000 after a user has entered the search string "fox" in a query entry box 1200. The interface presents suggested search terms 1400 in a drop-down list. The user can select one of the displayed terms to execute the search, or can continue typing to obtain more focused search terms.

FIG. 2 displays a closer view of the suggested search term dropdown list 1400 of television guide user interface 1000 of FIG. 1. The suggested search term dropdown list 1400 is configured to provide relevant channels 1420, cast members 1460 and program titles 1440 to the user. The search predicts and suggests results in all three categories. In one embodiment, the suggested search term window 1400 has a predetermined maximum number of suggested search terms. In the illustrated embodiment, the window 1400 displays no more than 10 suggested search terms.

In one embodiment, the number of suggested search terms displayed in each category is proportional to the total number of suggested search terms in each category. For example, suppose that for the term "fox", 58 possible search terms are found. Out of these results, suppose that 24 are channels, 15 are titles and 19 are cast members. The number of entries for each category can be calculated as follows:

Channels: ((24/58)*10)=4.1379 (rounded down to 4)

Titles: ((15/58)*10)=2.586 (rounded up to 3)

Cast: ((19/58)*10)=3.275 (rounded down to 3)

Thus, the 4 most relevant suggested search terms relating to channels, and the 3 most relevant suggested search terms relating to titles and cast are to be displayed.

FIG. 3 displays sample search results produced when the user selects a suggested search term relating to channels 1420, program titles 1640 and cast members 1660.

Figure 4:
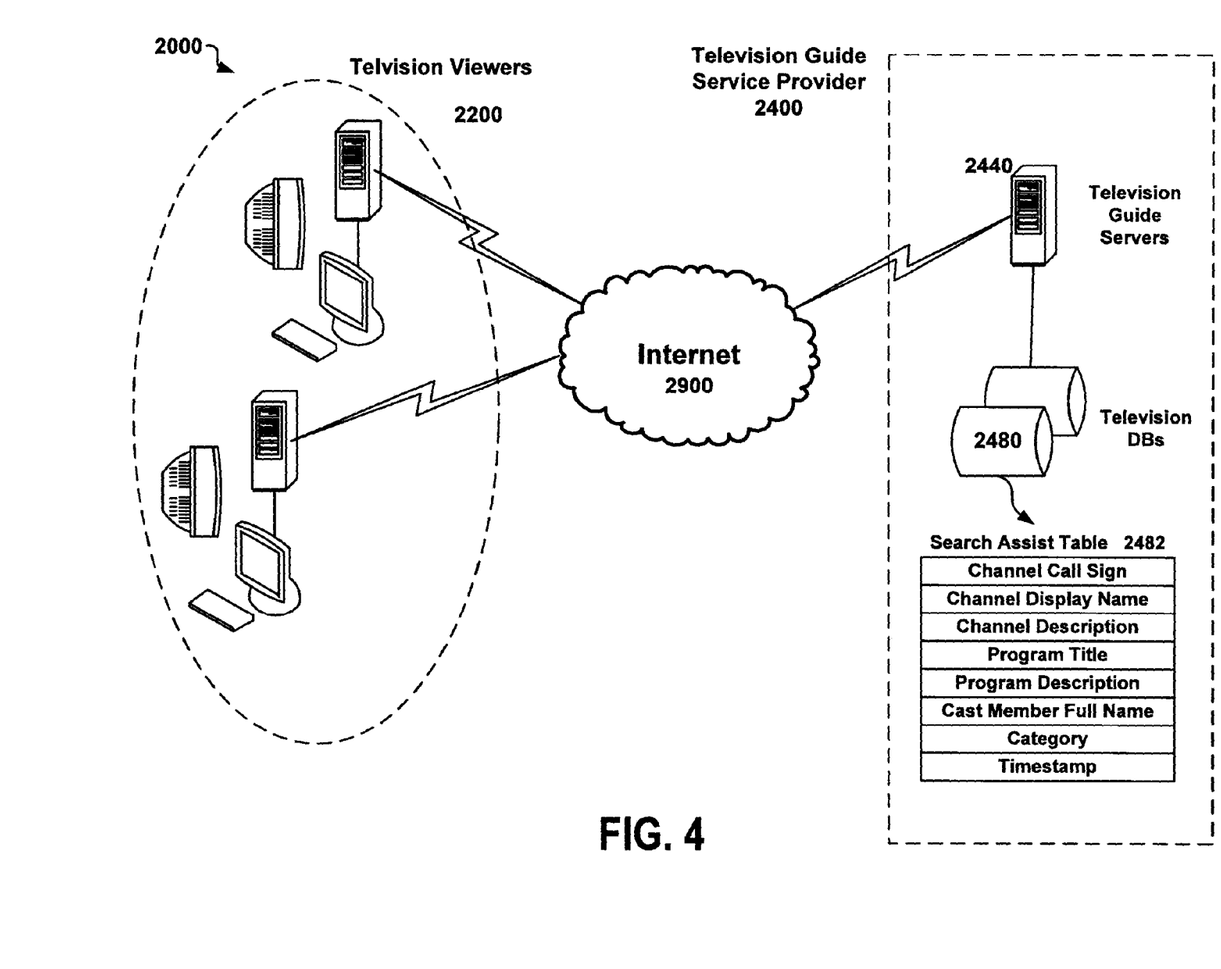
FIG. 4 illustrates a high-level view of a system capable of providing an online television guide with categorized search assistance functions.

FIG. 4 illustrates a high-level view of a system 2000 capable of providing an online television guide with categorized search assistance functions. Television viewers 2200 access, inter alia, television guide services over the Internet 2900. Television guide services are provided by television guide service providers 2400 such as, for example, Yahoo!. In one embodiment, television guide service providers 2400 maintain one or more television guide servers 2440 and television programming databases 2480, such as, for example, a set of electronic programming guide databases comprising detailed information on television programs on multiple channels.

In one embodiment, the television databases include a suggested search term table 2484. The table comprises data relating to channels, program titles and cast members consolidated into a single table. In one embodiment, data is extracted from the electronic programming guide databases 2480 on a periodic basis, for example, nightly, and is imported into the suggested search term table 2484 and the table is re-indexed. In one embodiment, the suggested search term table 2484 comprises information for every channel, program per channel, and cast member associated with a program per channel. In one embodiment, this information includes channel call letters, channel display name, channel description, program title, program description and cast member full name In one embodiment, each record in the search assist table 2484 additionally comprises a search assist category such as, for example, channels, program titles and cast members. In one embodiment, each record in the search assist table 2484 table additionally comprises a timestamp field that can be used to filter out programming that has already aired. In one embodiment, channel records have a timestamp equivalent to the end time for the last program present in the current electronic data. Program records have a timestamp equal to the last end time for the program per channel and cast member records use a timestamp equal to the last time a program ends for which they are associated with per channel.

The system shown in FIG. 4 is purely illustrative. Those skilled in the art will appreciate that the functions provided by the system in FIG. 4 could be provided by a number of alternate configurations.

FIG. 5 illustrates one embodiment of a method 3000 for providing a category based search assist function in an online television guide. A television program search query comprising one or more tokens is received 3100 from a user. In one embodiment, the query could comprise one or more terms relating to a channel, a program or a cast member of a program. In one embodiment, the characters comprising the search query are received and analyzed as soon as the user begins typing in a query entry box on a television program search interface. In one embodiment, the characters comprising the search query are received and analyzed only after a minimum number of characters, for example, three, have been typed in the query entry box.

A plurality of suggested search terms that match the television program search query are then selected 3200 from a suggested search term database. In one embodiment, each of the suggested search terms comprise a description of a channel, a program title or the full name of a cast member and each of the suggested search terms is assigned to one of a plurality of categories. In one embodiment, such categories include channel, program and cast member.

In one embodiment, suggested the suggested search term database includes information for every channel, program per channel, and cast member associated with a program per channel and additionally includes a category for every entry on the table. In one embodiment, each record in the suggested search term database additionally includes a timestamp field that can be used for filtering out past results. In one embodiment, how the timestamp is calculated depends on the type of data for each record. Channel records have a timestamp equivalent to the end time for the last program present in the current electronic programming data. In one embodiment, program records have a timestamp equal to the last end time for the program per channel and cast member records use a timestamp equal to the last time a program ends for which they are associated with per channel.

In one embodiment, the suggested search term database is queried to find all records matching the television program search query in the following database fields: channel call letters, channel display name, channel description, program title, program description and cast member full name.

In one embodiment, the results are limited such that results that have a timestamp that occurs before the current date and time are omitted. In one embodiment, the results are limited such that only results relating to channels in the user's current channel map are returned. In one embodiment, the results are limited such that only those suggested search terms that match the television program search query at the beginning of a word within a term are returned, for example, a query for "hous" will match records such as "House", "Desperate Housewives", "KTRK Houston, Tex. (CBS)", "Brian Houston", but not "Monica Calhoun" or "Jennifer Morehouse".

The selected suggested search terms are then ranked 3300 by relevance within each of the plurality of categories. In one embodiment, data is first ordered by records that contain the television program search query at the start of the record, then by electronic programming ranking (e.g. popularity) and finally by relevancy of the record (e.g. closeness of fit to the query). If the television program search query matches the result exactly, it will be placed at the top of its relevant category, else it will be placed at the end. In one embodiment, if the television program search query is numeric and corresponds to the tuner position for a channel in the users channel map, the channel will be added to the top of the channel group.

In one embodiment, if the number of suggested search terms exceeds a predetermined total number, $n_t$ (such as the total number of suggested search terms displayable by a television guide user interface), a number of suggested search terms to be returned to the user, $n_c$, is determined 3400 for each of the plurality of categories such that $n_t = \Sigma n_c$. In one embodiment, for each of the plurality of categories, $n_c$ is equal to a ratio of the number of suggested search terms in the respective category to the total number of suggested search terms multiplied by the predetermined total number, $n_t$.

In one embodiment, the number of suggested search terms for each category is divided by the total number of suggested search terms, then multiplied by the predetermined total number and is then rounded up or down to the nearest whole number. For example, in the example above for the term "fox", 58 possible search terms are found. Out of these results, suppose that 24 are channels, 55 are titles and 59 are cast members. The number of entries for each category can be calculated as follows:

Channels: ((24/58)*10)=4.1379 (rounded down to 4)

Titles: ((15/58)*10)=2.586 (rounded up to 3)

Cast: ((19/58)*10)=3.275 (rounded down to 3)

In other embodiments, other rounding schemes could be used. In one embodiment for a scheme employing three categories, the product of the smallest two categories is rounded up to the nearest whole number, while the product of the largest group is rounded down to the nearest whole number or the nearest whole number minus one, as necessary, to produce a total count equal to the predetermined total number. Other rounding schemes are possible, as will be readily apparent to those skilled in the art. In the case where the television program search query returns a number of suggested search terms less than or equal to the predetermined total number, the number of result search terms, $n_c$ in each category will be equal to the number of suggested search terms in that category returned by the television program search query.

A consolidated result set is then created 3500. In one embodiment, for each of the plurality of categories, the top ranked $n_c$ suggested search terms in the respective category are added to the consolidated result set. In one embodiment, the suggested search terms are added to the result set in the order of channel, title and finally cast results. The consolidated result set is then transmitted 3600 to the user.

A selection of suggested search terms in the consolidated result set is received 3700 from the user. The selection can be received after a first set of suggested search terms is transmitted to the user, or it can be received after multiple sets of suggested search terms are transmitted to the user in response to multiple character entries. The selected suggested search term is then used to conduct 3800 a television programming search.

In one embodiment, the steps 3100-3600 are repeated every time the user enters a new query or modifies an existing query until a selection of a suggested search term is received 3700 from the user.

It will be readily apparent to those skilled in the art that the principles discussed above with reference to search assist functions provided by a television programming search application could be adapted to a search application for other types of scheduled, broadcast programming, such as audio programming (e.g. Internet radio). It will also be readily apparent that the principles discussed above with reference to search assist functions provided by a television programming search application could be more generally adapted for any network search application where suggested search terms can be categorized into a plurality of categories.

Figure 6:
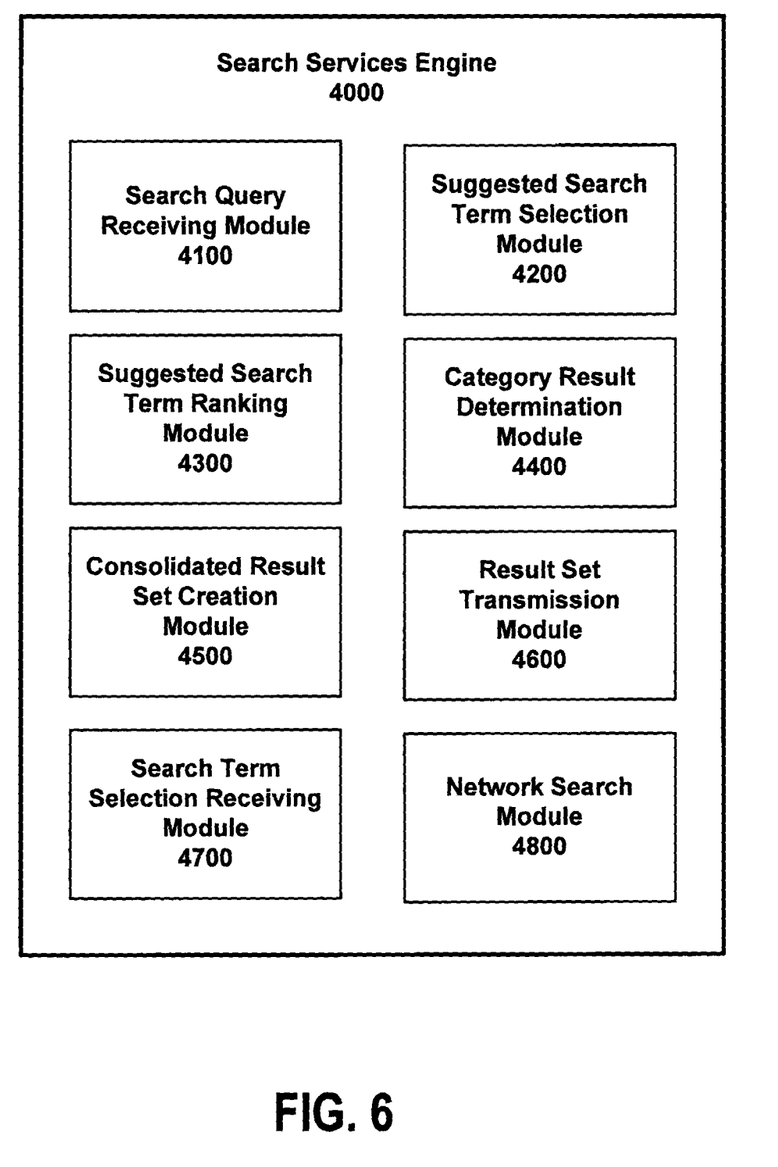
FIG. 6 illustrates one embodiment of search services engine capable of supporting at least one embodiment of the process shown in FIG. 5.

FIG. 6 illustrates one embodiment of search services engine 4000 capable of supporting at least one embodiment of the process shown in FIG. 6. The search services search engine comprises one or more modules. Each module comprises one or more processors programmed to execute software code retrieved from a computer readable storage medium storing software for performing various functions. In one embodiment, the search services engine 4000 comprises a search query receiving module 4100, a suggested search term selection module 4200, a suggested search term ranking module 4300, a category result determination module 4400, a consolidated result set creation module 4500, a result set transmission module 4600, a search term selection receiving module 4700, and a network search module 4800.

Each of the modules could be implemented on one or more servers or other computing device. For example, the each of the modules could be implemented on one or more television guide servers such as shown in 2440 of FIG. 6. Other configurations are possible, as will be readily apparent to those skilled in the art.

In one embodiment, the search query receiving module 4100 is configured to receive television program search queries comprising one or more tokens from users, over a network, such as the Internet. In one embodiment, such queries could comprise one or more terms relating to a channel, a program or a cast member of a program. In one embodiment, the search query receiving module 4100 provides an API that allows a user application, such as an online television guide application, to submit search queries to the module.

In one embodiment, the suggested search term selection module 4200 is configured to select, for each television program search query received by the search query receiving module 4100, a set of suggested search terms from a suggested search term database that match the respective television program search query, where each suggested search term is assigned to one of a plurality of categories. In one embodiment, suggested search terms selected by the suggested search term selection module 4200 comprise a description of a channel, a program title or the full name of a cast member and are assigned to categories comprising channels, programs or cast members.

In one embodiment, the suggested search term database comprises a single suggested search term table that is populated and re-indexed on a periodic basis using an import of electronic programming data from an electronic programming guide database. In one embodiment, the suggested search term table is stored as a relational database. In one embodiment, full text indexes are maintained for all searched fields.

In one embodiment, the search assist database includes information for every channel, program per channel, and cast member associated with a program per channel. In one embodiment, the search assist database additionally includes a category for every entry on the database. In one embodiment, each entry on the database additionally includes a timestamp field that can be used for filtering out past results.

In one embodiment, the suggested search term database is queried to find all records matching the search term in the following locations: channel call letters, channel display name, channel description, program title, program description and cast member full name.

In one embodiment, the results are limited so that results that have a timestamp that occurs before the current date and time are omitted. In one embodiment, the results are limited so that only results relating to channels in the user's current channel map are returned. In one embodiment, the results are limited so that only those suggested search terms that match a television program search query at the beginning of a word are returned.

In one embodiment, the suggested search term ranking module 4300 is configured to rank suggested search terms within each of the plurality of categories within each set of suggested search terms selected by the suggested search term selection module 4200. In one embodiment, data is first ordered by records that include the television program search query at the start of the record, then by electronic programming ranking (e.g. popularity) and finally by relevancy of the record (e.g. closeness of fit to the query). If the television program search query matches the result exactly, it will be placed at the top of its relevant category, else it will be placed at the end. In one embodiment, if the television program search query is numeric and corresponds to the tuner position for a channel in the users channel map, the channel will be added to the top of the channel category.

In one embodiment, the category result determination module 4400 is configured to determine, for each set of suggested search terms ranked by the suggested search term ranking module 4300, a number of suggested search terms to be returned in a consolidated result set, $n_c$, for each of the plurality of categories within the set. Each of the number of category result search terms, $n_c$, is equal to a ratio of the number of suggested search terms in the respective category to a total number of suggested search terms in the set multiplied by a predetermined total number, $n_r$. In various embodiments, $n_c$ for each set of suggested search terms is determined using one or more of the rounding techniques described above with reference to operation 3400 of the method 3000 shown in FIG. 5.

In one embodiment, the consolidated result set creation module 4500 is configured to create a consolidated result set for each set of suggested search terms processed by the category result determination module 4400 by adding, for each of the plurality of categories, the top ranked $n_c$ suggested search terms in the respective category to the respective consolidated result set.

In one embodiment, the result set transmission module 4600 is configured to transmit, over the network, consolidated result sets created by the consolidated result set creation module 4500 to users whose respective query resulted in the creation of the respective consolidated result set.

In one embodiment, the search term selection receiving module 4700 is configured to receive, over the network, from users who received consolidated result sets from the result set transmission module 4600, selections of suggested search terms from the respective consolidated result sets.

In one embodiment, network search module 4800 is configured to conduct television programming searches using search terms selected by the search term selection receiving module.

Figure 7:
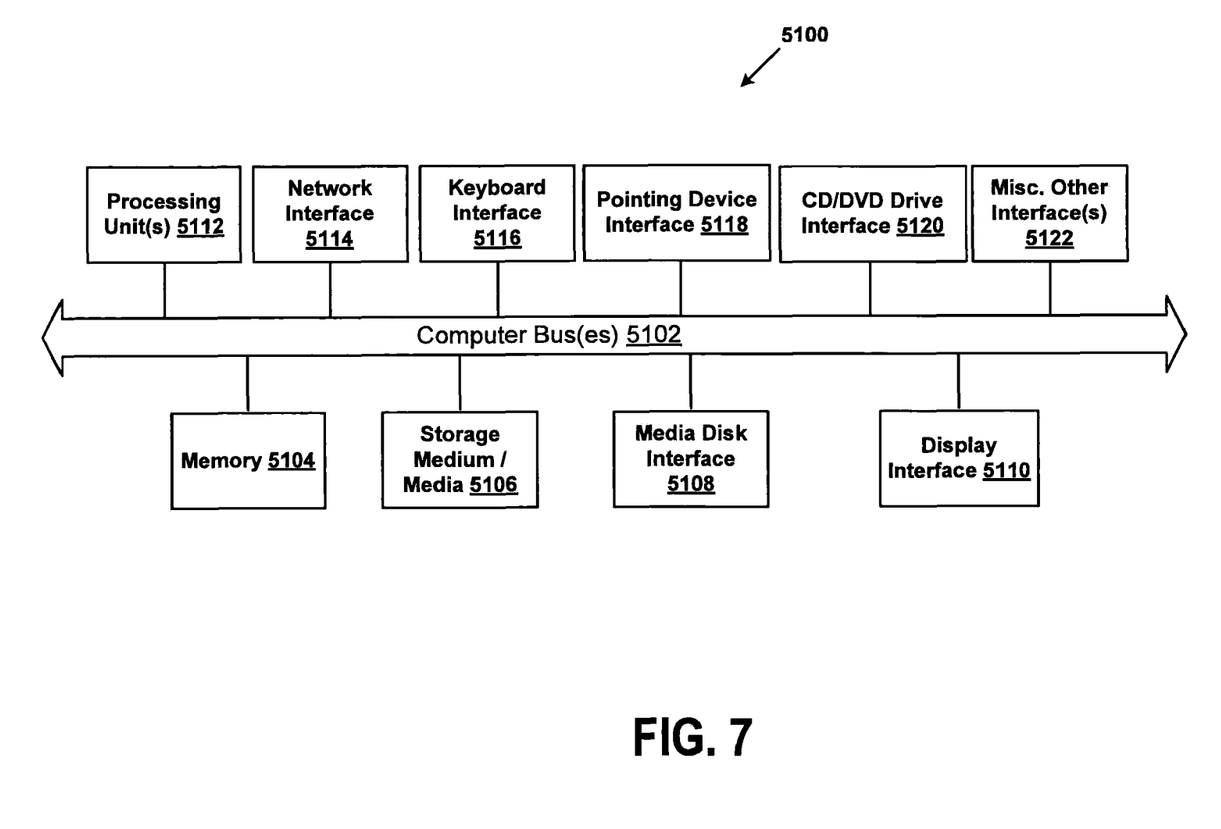
FIG. 7 is a block diagram illustrating an internal architecture of an example of a computing device, such the television guide server computers and/or the processors supporting the search services engine of FIG. 6, in accordance with one or more embodiments of the present disclosure.

FIG. 7 is a block diagram illustrating an internal architecture of an example of a computing device, such the television guide server computers 2440 and/or the processors supporting the search services engine of FIG. 6, in accordance with one or more embodiments of the present disclosure. A computing device as referred to herein refers to any device with a processor capable of executing logic or coded instructions, and could be a server, personal computer, set top box, smart phone, pad computer or media device, to name a few such devices. As shown in the example of FIG. 8, internal architecture 5100 includes one or more processing units (also referred to herein as CPUs) 5112, which interface with at least one computer bus 5102. Also interfacing with computer bus 5102 are persistent storage medium/media 5106, network interface 5114, memory 5104, e.g., random access memory (RAM), run-time transient memory, read only memory (ROM), etc., media disk drive interface 5108 as an interface for a drive that can read and/or write to media including removable media such as floppy, CD☐ROM, DVD, etc. media, display interface 5110 as interface for a monitor or other display device, keyboard interface 5116 as interface for a keyboard, pointing device interface 5118 as an interface for a mouse or other pointing device, and miscellaneous other interfaces not shown individually, such as parallel and serial port interfaces, a universal serial bus (USB) interface, and the like.

Memory 5104 interfaces with computer bus 5102 so as to provide information stored in memory 5104 to CPU 5112 during execution of software programs such as an operating system, application programs, device drivers, and software modules that comprise program code, and/or computer☐executable process steps, incorporating functionality described herein, e.g., one or more of process flows described herein. CPU 5112 first loads computer☐executable process steps from storage, e.g., memory 5104, storage medium/media 5106, removable media drive, and/or other storage device. CPU 5112 can then execute the stored process steps in order to execute the loaded computer-executable process steps. Stored data, e.g., data stored by a storage device, can be accessed by CPU 5112 during the execution of computer-executable process steps.

Persistent storage medium/media 5106 is a computer readable storage medium(s) that can be used to store software and data, e.g., an operating system and one or more application programs. Persistent storage medium/media 5106 can also be used to store device drivers, such as one or more of a digital camera driver, monitor driver, printer driver, scanner driver, or other device drivers, web pages, content files, playlists and other files. Persistent storage medium/media 5106 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
   receiving, over a network from a user, a network search query comprising at least one token;
   selecting, using a computing device, a plurality of suggested search terms from a suggested search term database that match the network search query, each of the plurality of suggested search terms being assigned to one of a plurality of categories;
   ranking, using the computing device, the plurality of suggested search terms within each of the plurality of categories;
   determining, using the computing device, a number of suggested search terms to be returned to the user for each of the plurality of categories, the determined number of suggested search terms returned to the user being equal to a ratio of the number of suggested search terms in the respective category to a total number of suggested search terms multiplied by a total number of displayed search terms, such that a respective timestamp for each category is calculated dependent upon each category type and is associated with a suggested search term in a category, the timestamp corresponding to a respective end time, such that search terms having a respective timestamp less than the current time are not selected; and creating, using the computing device, a consolidated result set by adding, for each of the plurality of categories, the top ranked suggested search terms in the respective category to the consolidated result set.

2. The method of claim 1, wherein, the network search query is a program search query for searching an online programming guide, the suggested search term database relates to the online programming guide, the selected suggested search term is used to search the online programming guide.

3. The method of claim 2, wherein the suggested search terms are selected from the list: a description of a channel, a program title and a name of a cast member, and wherein the plurality of categories comprise the categories: channel, program title, and cast member.

4. The method of claim 3, wherein only suggested search terms associated with a channel in a channel map associated with the user are selected.

5. The method of claim 1, wherein only suggested search terms that match the network search query at the beginning of a word within the respective suggested search term are selected.

6. The method of claim 1, wherein plurality of suggested search terms are ranked such that suggested search terms that include the network search query at the start of the respective suggested search term are ranked first, and remaining suggested search terms are ranked by an electronic programming ranking and by a relevancy of the suggested search terms to the network search query.

7. The method of claim 1, such that where the respective end time relates to a channel, the timestamp is equivalent to an end time for the last program scheduled for the channel.

8. The method of claim 1, such that where the respective end time relates to a program title, the timestamp is equivalent to a last end time for the program scheduled on a channel.

9. The method of claim 1, such that where the respective end time relates to a cast member, the timestamp is equivalent to a last end time for a program associated with the cast member is scheduled on a channel.

10. The method of claim 1 additionally comprising:
transmitting, over the network, to the user, the consolidated result set.

11. The method of claim 1 additionally comprising:
receiving, over the network, from the user, a selection of a suggested search term.

12. The method of claim 11, wherein the steps of receiving a network search query, selecting a plurality suggested search terms, ranking, determining, creating, and transmitting are repeated a plurality of times until a selection of a suggested search term is received.

13. The method of claim 11, the method of claim 1 additionally comprising:
conducting, using the computing device, a network search using the selected suggested search term.

14. A non-transitory computer-readable medium having tangibly stored thereon computer-executable instructions, that when executed by a processor, perform a method:
receiving, by the computing device over a network from a user, a network search query comprising at least one token;
selecting, using the computing device, a plurality of suggested search terms from a suggested search term database that match the network search query, each of the plurality of suggested search terms being assigned to one of a plurality of categories;
ranking, using the computing device, the plurality of suggested search terms within each of the plurality of categories;
determining, using the computing device, a number of suggested search terms to be returned to the user for each of the plurality of categories, the determined number of suggested search terms returned to the user being equal to a ratio of the number of suggested search terms in the respective category to a total number of suggested search terms multiplied by a total number of displayed search terms, such that a respective timestamp for each category is calculated dependent upon each category type and is associated with a suggested search term in a category, the timestamp corresponding to a respective end time, such that search terms having a respective timestamp less than the current time are not selected; and
creating, using the computing device, a consolidated result set by adding, for each of the plurality of categories, the top ranked suggested search terms in the respective category to the consolidated result set.

15. The non-transitory computer-readable medium of claim 14, additionally comprising:
transmitting, over the network, to the user, the consolidated result set.

16. The non-transitory computer-readable medium of claim 15 additionally comprising:
receiving, over the network, from the user, a selection of a suggested search term.

17. The non-transitory computer-readable medium of claim 16, wherein the steps of receiving a network search query, selecting a plurality suggested search terms, ranking, determining, creating, and transmitting are repeated a plurality of times until a selection of a suggested search term is received.

18. A system comprising:
a processor;
a non-transitory storage medium for tangibly storing thereon program logic for execution by the processor, the program logic comprising:
logic executed by the processor for receiving, over a network from a user, a network search query comprising at least one token;
logic executed by the processor for selecting a plurality of suggested search terms from a suggested search term database that match the network search query, each of the plurality of suggested search terms being assigned to one of a plurality of categories;
logic executed by the processor for ranking the plurality of suggested search terms within each of the plurality of categories;
logic executed by the processor for determining, using the computing device, a number of suggested search terms to be returned to the user for each of the plurality of categories, the determined number of suggested search terms returned to the user being equal to a ratio of the number of suggested search terms in the respective category to a total number of suggested search terms multiplied by a total number of displayed search terms, such that a respective timestamp for each category is calculated dependent upon each category type and is associated with a suggested search term in a category, the timestamp corresponding to a respective end time, such that search terms having a respective timestamp less than the current time are not selected; and logic executed by the processor for creating, using the computing device, a consolidated result set by adding, for each of the plurality of categories, the top ranked suggested search terms in the respective category to the consolidated result set.

19. The system of claim 18, wherein the program logic additionally comprises:

logic executed by the processor for transmitting, over the network, to the user, the consolidated result set; and logic executed by the processor for receiving, over the network, from the user, a selection of a suggested search term.

20. The system of claim 18, wherein receiving a network search query, selecting a plurality suggested search terms, ranking, determining, creating, and transmitting are repeated a plurality of times until a selection of a suggested search term is received.

* * * * *